March 3, 1953  A. C. SCHIER, JR., ET AL  2,630,013
TIRE AIR PRESSURE GAUGE
Filed Nov. 3, 1948  5 Sheets-Sheet 1

INVENTORS.
Alvin C. Schier, Jr.
Richard V. Layton.
BY James E. Sproll
ATTORNEY.

March 3, 1953     A. C. SCHIER, JR., ET AL     2,630,013
TIRE AIR PRESSURE GAUGE
Filed Nov. 3, 1948     5 Sheets-Sheet 2

INVENTORS.
Alvin C. Schier, Jr.
Richard V. Layton.
BY James E. Sproll
ATTORNEY.

March 3, 1953    A. C. SCHIER, JR., ET AL    2,630,013
TIRE AIR PRESSURE GAUGE

Filed Nov. 3, 1948    5 Sheets-Sheet 3

INVENTORS.
Alvin C. Schier, Jr.
Richard V. Layton.
BY James E. Sproll
ATTORNEY.

March 3, 1953   A. C. SCHIER, JR., ET AL   2,630,013
TIRE AIR PRESSURE GAUGE
Filed Nov. 3, 1948   5 Sheets-Sheet 4

INVENTORS.
Alvin C. Schier, Jr.
Richard V. Layton
BY James E. Sproll
ATTORNEY.

Patented Mar. 3, 1953

2,630,013

UNITED STATES PATENT OFFICE 2,630,013

TIRE AIR PRESSURE GAUGE

Alvin C. Schier, Jr., and Richard V. Layton,
Port Hadlock, Wash.

Application November 3, 1948, Serial No. 58,092

7 Claims. (Cl. 73—390)

This invention relates to novel improvements in tire air pressure gauges and/or gauge apparatus for vehicles having pneumatic tired wheels.

Heretofore, on vehicles having wheels equipped with pneumatic tires, various indicating and/or signalling devices, of both audible and visual types, have been employed for indicating and/or signalling to the operators of such vehicles when the air pressure in the tires of same had dropped or fallen to a critically low point or value. However, in actual use and for manifold reasons, these devices were found to be deficient and wholly inadequate to accomplish their intended purpose and in consequence were never adopted by automobile and truck manufacturers, nor by the users of these vehicles.

It is, therefore, the primary aim and principal object of the present invention to overcome the objections to and deficiencies of the former devices of the character stated by providing a practical and workable tire air pressure gauge and/or gauge apparatus especially designed and particularly adapted to be readily and economically installed or incorporated in and on all types of vehicles employing pneumatic tired wheels, whereby the specific air pressure or degree of inflation in pounds in each tire of said vehicles, including spares, if any, is individually registered and may be quickly observed during operational periods of the vehicles and during non-operational periods of same may be rapidly and readily ascertained and/or checked by closure of the vehicle ignition switches or any other switches specifically provided for such purposes.

Another object of the invention is to provide a gauge and/or gauge apparatus of the above character adaptable for employment and use with any standard make or conventional type of pneumatic tired wheel without any change being made thereto other than mounting the gauge apparatus control or sender unit and its appurtenant parts within the hub cap of same, which mounting does not in any way affect the interchangeability of the wheel and/or tire, nor does it preclude the substitution and use in their place and stead of another wheel and/or tire of the same make and size providing the control or sender unit equipped hub cap is retained for use and placement upon the substitute wheel.

A further object is to provide a tire air pressure gauge for a pneumatic tired wheel, said gauge having a control or sender unit which is carried by the hub cap of said wheel and which is not affected by the speed of rotation of said wheel, nor by the severest road shocks to which the latter may be subjected.

A still further object is to provide a tire air pressure gauge for a pneumatic tired wheel, the control or sender unit of which gauge is carried by and located upon the hub cap of said wheel in such a manner as to preserve wheel balance and not affect same in any way.

A still further object is to provide a gauge and/or gauge apparatus of the character stated, which may be readily incorporated at a relatively low cost in and on either new or old vehicles employing pneumatic tired wheels without changing the vehicle or wheel structures in any marked or radical degree, or changing the general or over-all appearance of the vehicles, whether new or old.

A still further object is to provide a tire air pressure gauge especially adaptable and suitable for employment and use upon and with the modern type of pneumatic tired demountable steel wheels having the recently adopted flexible inner tube valves.

A still further object is to provide a tire air pressure gauge and/or gauge apparatus, which is especially adaptable and suitable for employment and use on trucks and truck trailers having dual or multiple pneumatic tires, whereby all of the inflating valves of the tires of each wheel are focalized at the wheel hub cap and are thereby rendered ready accessible for attachment of the air supply hose thereto, where, heretofore access to some of these valves could only be had with difficulty through restricted openings in the truck or trailer wheel.

A still further object is to provide a gauge and/or gauge apparatus of the above character, which is also especially adaptable and suitable for employment and use on and with the pneumatic tired wheels of airplane landing gear, whereby the pilot of an airplane may be advised prior to coming in for a landing, whether the tires of his landing gear are in their normally inflated condition, or whether any of such tires have become deflated, for any reason, in flight and be governed accordingly in making his landing.

A still further object is to provide a gauge and/or gauge apparatus of the character stated, which will function with equal and uniform efficiency with the relatively low tire pressures of automotive passenger vehicles and the relatively high tire pressures of trucks and truck trailers.

A still further object is the provision of a highly sensitive tire air pressure gauge and/or gauge apparatus for a pneumatic tire or tires, which will accurately respond to and will register by infinitesimal increments any changes or variations of air pressure in said pneumatic tire or tires, rather than step to step air pressure changes of considerable value, as in former devices of this type.

The above, and additional objects which will hereinafter be more specifically treated are attained by such means as are shown in the accompanying drawings, described in the following specification, and then more clearly pointed out in the claims, which are appended hereto and form part of this application.

With reference to the drawings, in which there are illustrated several embodiments of the invention, and throughout the several views of which like characters of reference designate similar parts.

Before taking up the detailed description of the drawings, a brief exposition of the particular applications and principal advantages of the novel and improved tire air pressure gauge apparatus or system evolved by the present invention will be here undertaken.

A particularly advantageous and desirable application of the present gauge apparatus or system is the installation and use of same on vehicles, such as, ambulances, busses, fire and police department vehicles, trackless trolleys, taxicabs and the like, inasmuch as, use of the gauge apparatus on these vehicles conserves both labor and time of the inspectors and/or maintenance men in their daily or period checks of the tires of same; further, it is extremely and obviously important that the tires of such public vehicles be at all times properly and sufficiently inflated for public safety.

The installation and use of the present gauge apparatus or system in and on truck and trailer units having sixteen, twenty or more pneumatic tires is also particularly advantageous and desirable, in order that the air pressure in each and all of the tires of such a unit may be quickly checked by merely glancing at the gauges of the apparatus during operational periods of the truck and trailer units and during idle periods thereof or before starting on a trip the air pressure in the tires of same may be rapidly and readily ascertained or checked by the truck operator, or by an inspector or maintenance man, turning on the truck ignition switch, thus eliminating individual checking of the truck and trailer tires as was formerly necessary; further, by using the present apparatus on truck or trailer wheels having two or more pneumatic tires all of the inflating valves for said tires are focalized at the wheel hub cap, where they are readily accessible for attachment of the air supply hose thereto, thereby eliminating the necessity of inserting such hose through restricted openings in the truck or trailer wheel to reach and attach same to remotely located tire valves, as was required heretofore.

The present gauge apparatus or system may also be advantageously employed on and with the pneumatic tired wheels of airplane landing gear, whereby the airplane pilot may be advised of the inflated or uninflated condition of his landing gear tires and be guided accordingly when coming in for a landing, as hereinbefore mentioned, thus minimising the danger or possibility of a crack-up. This is particularly applicable to military and naval aircraft when returning from a mission a pilot of such a craft may be unaware that one or more of his landing gear tires have been punctured in combat, and without tire air pressure gauges to warn of this condition, the possibility of avoiding a crack-up on landing is extremely remote. Many crack-ups of naval aircraft on the necessarily limited and restricted landing decks of aircraft carriers, in the recent war, could and would have been avoided and many fighter pilot lives saved and serious injuries to other fighter pilots, been prevented had these pilots known or been warned beforehand of their punctured landing gear tires.

The installation and use of the present gauge apparatus or system in and on automotive vehicles, of both passenger and commercial types, is positive insurance against accidents, personnel and/or vehicle damage and loss of lives due to tire failures, where heretofore vehicles not so equipped have frequently been damaged or wrecked, oftentimes with loss of lives and/or serious injuries to the operators and riders of said non-equipped vehicles, because the air pressure in one or more tires of these vehicles, due to slow leaks or otherwise, fell undetected and unobserved below a critical point or safe operating level. The use of the present gauge apparatus or system also materially increases and prolongs the life of the vehicle tires by instantly warning the vehicle operator when a drop in air pressure in any of said tires occurs, so that the condition or conditions causing such drop may be immediately remedied by the operator and by so doing eliminate the excessive and unnecessary wear on such tires by driving with the same only partially inflated. Further, the use of the present gauge apparatus or system upon automotive vehicles, of both passenger and commercial types, has no deleterious or enervating effect upon the vehicle batteries or generators, as the amount of current consumed or drawn by the apparatus is relatively negligible and barely registrable on the vehicle ammeters.

In its preferred embodiment the present invention essentially resides in and is characterized by the employment in conjunction with the demountable wheel hub caps of the pneumatic tired wheels and with the dash or instrument board of an automotive vehicle, of a tire air pressure gauge apparatus or system comprising a series of pneumatically operable and thermo-electrical control or sender units individually carried by and removable with said demountable wheel hub caps and also connected to their individual pneumatic tires for responsive actuation by the air pressure therein, and a series of thermo-electrical receiver or gauge units located upon said dash or instrument board and individually connected to their companion sender units for control thereby and for registering upon their gauges the air pressures in the tires with which their companion sender units are connected, all of which are important features of the invention and are to be correlated in the broad aim of enhancing the efficiency of the apparatus for the uses and purposes for which it is primarily designed and intended.

Figures 1, 6, 7, 8, 9:
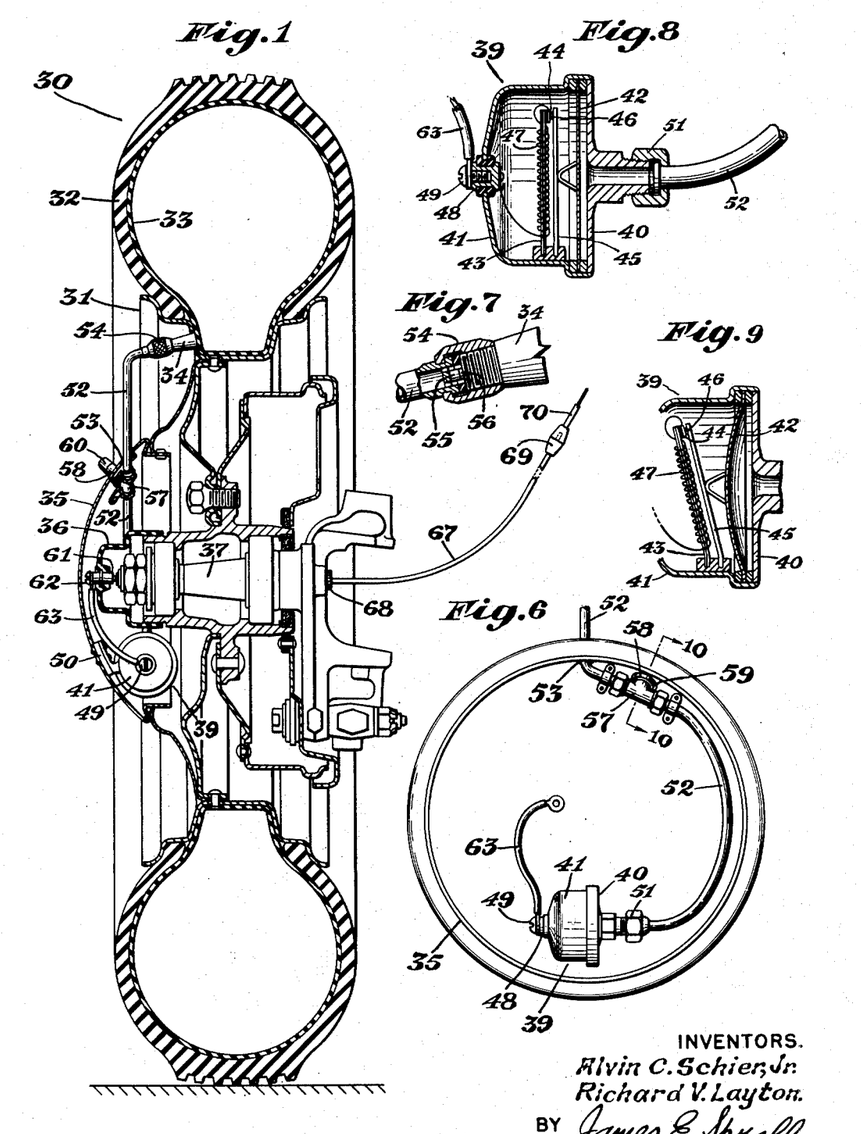
Figure 1 is a vertical transverse section of a left front automotive vehicle wheel assembly equipped with the thermo-electrical control or sender unit of the tire pressure gauge comprehended by the present invention.
Fig. 6 is an elevational view of the inner face of a demountable automotive vehicle wheel hub cap equipped with the tire air pressure gauge thermo-electrical control or sender unit and the appurtenant connections for same.
Fig. 7 is an enlarged fragmentary detail view partially in elevation and partially in section illustrating the manner of coupling the control or sender unit to the inner tube valve of its related pneumatic tire.
Fig. 8 is an enlarged vertical section of the thermo-electrical control or sender unit employed with the tire air pressure gauge, as it would appear when inactive.
Fig. 9 is an enlarged fragmentary vertical section of the same, as it would appear when activated by the tire air pressure.
Figures 2, 10, 11:
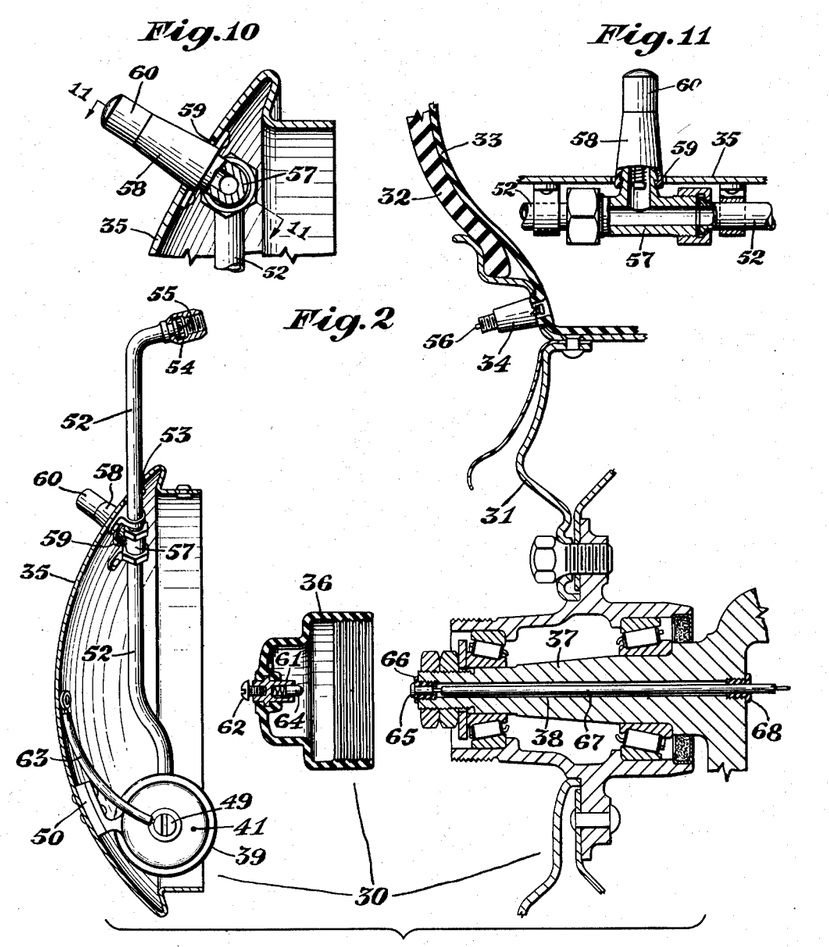
Fig. 2 is a fragmentary exploded sectional view of the same.
Fig. 10 is an enlarged fragmentary transverse vertical section taken on line 10—10 of Fig. 6, illustrating the T fitting and supplementary tire inflating valve carried by the wheel hub cap.
Fig. 11 is an enlarged fragmentary horizontal section of same taken on line 11—11 of Fig. 10.

Beginning now the more detailed description of the invention by reference to Figs. 1 and 2 of the drawings, in which the numeral 30 generally designates an automotive vehicle left front wheel assembly, 31 the steel wheel of same, 32 the tire casing, 33 the inner tube, 34 the inner tube valve, 35 the wheel hub cap, 36 the hub grease cap and 37 the steering knuckle thereof having an axial or longitudinally disposed bore 38 therethrough for a purpose which will shortly be described.

Disposed within the wheel hub cap 35 and located therein, as close to the axis thereof as working rotative clearance with the hub grease cap 36 will reasonably permit, is a thermo-electrical control or sender unit 39 of the pressure responsive type, which latter is well known in the automotive industry, hence, no claim for novelty in such structure, per se, is made herein, except, and however, as such structure or its electrical or mechanical equivalent is combined with the other elements or features of the present invention to provide a new and novel combination. Inasmuch as the sender unit 39 is familiar to those skilled in the art it is thought that a brief description of same will suffice.

Accordingly, the numeral 40 denotes the base or body section of the sender unit 39, 41 the cover section, 42 the flexible diaphragm, 43 the flexing bi-metal arm having an insulated contact 44 upon its outer terminal, 45 the parallel flexing arm having a grounded contact 46 upon its outer terminal for abutment with said insulated contact, 47 the heater wire surrounding the flexing bi-metal arm 43 and connected at one end to the insulated contact 44 and at its opposite end to the sender unit terminal post 48 centrally mounted in the cover section 41 in insulated relation thereto and having a binding or clamping screw 49 for effecting connection of the sender unit 40 with the electric circuit of the tire pressure gauge, in a manner hereinafter more fully described.

The sender unit 39 is operatively mounted upon and secured to the inner face of the wheel hub cap 35 in any suitable or well known manner, preferably with a shock absorbing or insulating block or pad 50 of cushioning material, such as rubber, or the like, interposed therebetween, to thus prevent or minimise damage to the sender unit 39 due to rough or uneven road surfaces, as will be readily manifest and apparent. Detachably connected by a coupling nut 51 to the tire air pressure inlet end of the sender unit 39 is the inner terminal of a sectional curvilinear tire air pressure conducting tube or pipe 52, while the outer section of same is angularly bent to pass outwardly through an aperture 53, formed in the marginal portion of the wheel hub cap 35 in substantially diametrically opposed relation to the mounting of the sender unit 39 thereon, as shown more clearly in Fig. 6, and wherefrom said upper section extends radially and is again angularly bent adjacent its outer terminal towards the inner tube valve 34, so that such outer terminal may be detachably connected by a swivel coupling 54 carried by the same to the threaded outer terminal of said inner tube valve, as shown in Figs. 1 and 7. The inner tube valve 34 is normally held open when the swivel coupling 54 is attached thereto and for this purpose the outer terminal of the upper section of the tube 52 is provided with a central projecting stud 55 adapted to contact and depress the conventional spring-pressed pin 56 of the valve 34 in an obvious manner. To interconnect the hub cap supported opposing ends of the sections of the tube 52, at a point within the wheel hub cap 35, a T fitting 57 is provided for such purpose, said fitting in turn being provided upon its side branch with a tire inflating valve 58, similar in type to that of the inner tube valve 34, which valve 58 normally projects through an aperture 59, also formed in the marginal portion of the hub cap 35, to thereby render such valve readily accessible for attachment of the air supply hose thereto when the inner tube 33 is to be inflated, as will be readily understood. The valve 58, in the present instance, is provided with a typical valve cap 60, as shown in Figs. 10 and 11.

The hub grease cap 36, as now contemplated, is preferably fabricated from insulating material with the centrally bossed portion of same provided with an axially disposed and peripherally flanged terminal post 61 molded therein and extending therethrough, said post at its outer end having a binding or clamping screw 62 threadedly mounted therein for detachably securing, to such post, one of the perforated terminals of an insulated conductor or wire 63, the other or opposite perforated terminal of which is similarly secured by the binding screw 49 to the terminal post 48 of the sender unit 39, see Figs. 1, 2, 6 and 8. Slidably disposed within the recessed inner end portion of the terminal post 61 and normally projecting therefrom is a spring-pressed brush 64 adapted to normally abut and contact a button 65 seated within an insulated bushing 66 threadedly secured within the outer end of the axial bore 38 of the steering knuckle 37 and connected to the inner end of said button 65 is the outer terminal of an insulated conductor or lead 67, which latter extends through said bore and at the inner or opposite end of the latter passes through an insulated bushing 68 threadedly secured within the inner end of said bore 38, as shown in Fig. 2, said conductor 67 at its inner free terminal being provided with a disconnecting plug 69, whereby it may be rapidly and readily connected to and disconnected from an insulated conductor or lead 70 forming part of the tire air pressure gauge electrical circuit hereinafter more fully described.

Figures 3, 4, 5, 14, 15:
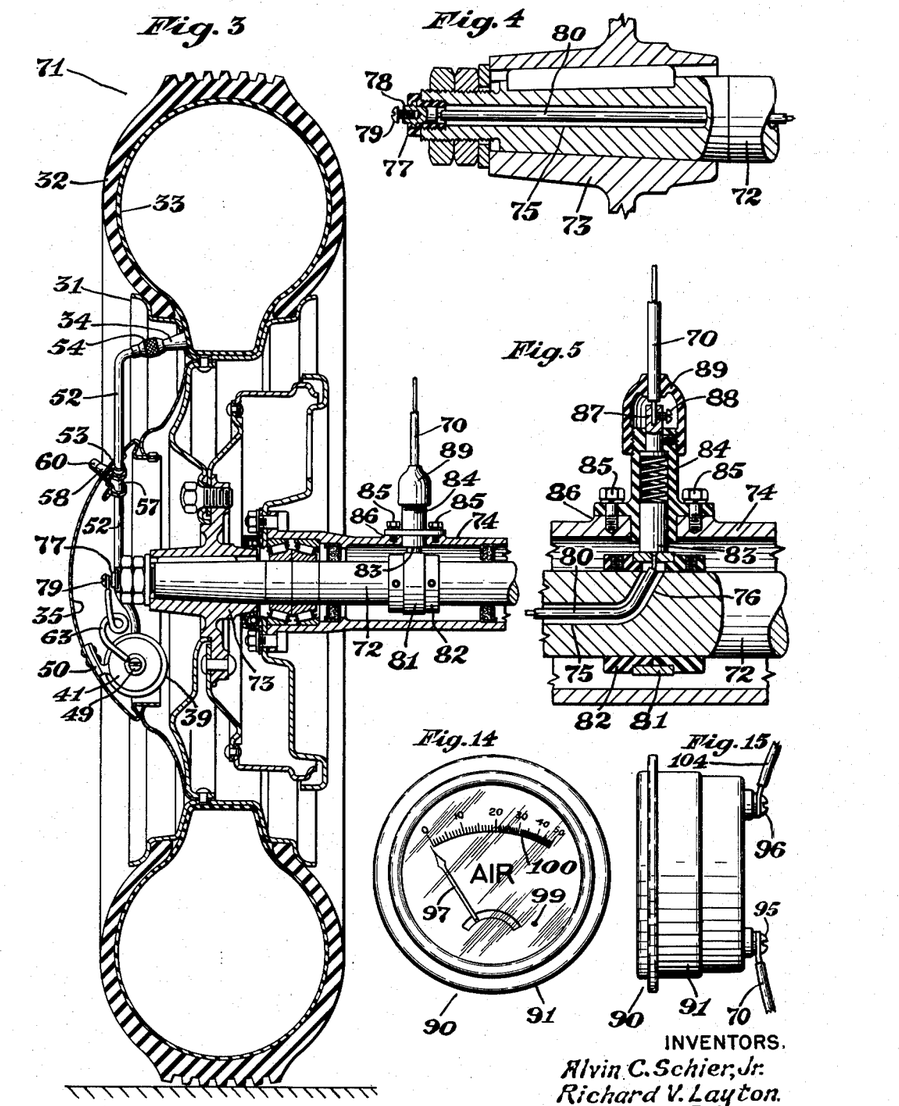
Fig. 3 is a vertical transverse section of a left rear automotive vehicle wheel assembly similarly equipped.
Fig. 4 is an enlarged fragmentary vertical longitudinal section of the left hand end portion of an automotive vehicle axle drive shaft fabricated to accommodate the wiring of the present tire air pressure gauge.
Fig. 5 is a similar section of an intermediate portion of said axle drive shaft and its associated shaft housing equipped with the commutator and brush of the tire air pressure gauge electrical circuit.
Fig. 14 is an enlarged elevation of the thermo-electrical receiver or gauge unit illustrating the pound pressure graduations on the face thereof.
Fig. 15 is a side elevation of the same.

In Fig. 3 the numeral 71 generally designates an automotive vehicle left rear wheel assembly having a pneumatic tired steel wheel similar in every respect to and interchangeable with the pneumatic tired wheel of the left front wheel assembly 30 previously described herein, including the tire air pressure sender unit 39 and its appurtenant parts, consequently, for brevity of description and for a readier understanding, the same reference numerals are used and applied to corresponding and interchangeable parts to properly identify the same without further description.

In Figs. 3 to 5, inclusive, the numeral 72 designates the axle drive shaft which is keyed in the usual manner to the rear wheel hub 73 and is customarily enclosed by the axle housing 74. The axle drive shaft 72 is provided with an axial bore 75 drilled from the outer end thereof to a point slightly beyond the plane of the inner side of the tire casing 32 and at such point said axle drive shaft is angularly drilled, as at 76, to establish communication with the inner end of the bore 75, all as more clearly shown in Figs. 4 and 5.

Threadedly secured within the outer end of the axial bore 75 is an insulating bushing 77 having an axially disposed and peripherally flanged terminal post 78 molded therein and extending therethrough, which terminal post at its outer end is provided with a binding or clamping screw 79 for detachably securing thereto the inner perforated terminal of the conductor 63, which latter at its opposite perforated terminal is connected to the sender unit 39 of the left rear wheel assembly 71 now being described. Connected to the inner end of the terminal post 78 is the outer terminal of an insulated conductor or lead 80, which latter extends through the bore 75 and also upwardly through the angular hole 76 and at its inner or opposite terminal is connected to a commutator ring 81 mounted upon the axle drive shaft 72 for rotation therewith and insulated therefrom by a sectional peripherally and annularly grooved insulating sleeve 82.

Normally abutting or contacting the commutator ring 81 is a spring-pressed brush 83 fabricated from carbon or soft copper, as deemed desirable or found expedient, said brush 83, in the present instance, being operatively and slidably mounted within a peripherally flanged cylindrical brush holder or casing 84 of non-conducting or insulating material, which brush holder 84 is detachably secured, as by hexagonal cap screws 85, to a facing pad 86 provided upon the periphery of the axle housing 74, see Figs. 3 and 5. Axially disposed within and extending through the apertured upper end of the brush holder 84 is a fixed terminal post 87 having its peripherally shouldered lower end enclosed within said brush holder and normally in abutment or contact with the upper end of the brush spring, as shown in Fig. 5, and having its outwardly projecting end axially recessed to receive and accommodate the lower terminal of an insulated conductor or lead 70 forming part of the tire air pressure gauge electrical circuit, as will hereinafter be more fully set forth, said lower terminal being detachably secured within the recessed upper end of the terminal post 87, as by a binding screw 88. To protect the connection of the conductor 70 with the terminal post 87 against damage, and from dust, mud, or the like, said connection is enclosed within a detachable cap 89, preferably of insulating material, which cap is mounted upon and threadedly secured to the exteriorly threaded upper end portion of the brush holder 84, see Fig. 5.

In Figs. 12 to 15, inclusive, the numeral 90 generally designates the thermo-electrical receiver or gauge unit employed with the present tire air pressure gauge for registering the amount of air pressure in the individual pneumatic tires of the vehicle including the spare tire, such receiver unit is also well known in the automotive industry and in consequence no claim for novelty in such structure, per se, is here made, except of course, as such device or its electrical or mechanical equivalent is employed in combination with the other elements or features of the invention to provide a new and novel combination. Since the gauge or receiver unit 90 is familiar to those skilled in the art to which this invention appertains, it is thought that a brief description of same will suffice.

Figure 12:
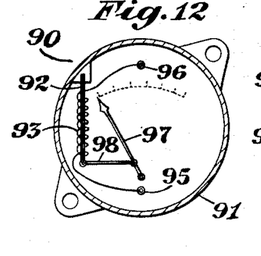
Fig. 12 is an enlarged transverse vertical section of the thermo-electrical receiver or gauge unit employed with the tire air pressure gauge, as it would appear when inactive.
Figure 13:
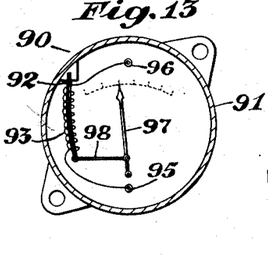
Fig. 13 is a similar section of same, as it would appear when in a tire air pressure registering position.

Wherefore, the numeral 91 denotes the receiver unit casing, 92 its flexing bi-metal arm, 93 the heater wire surrounding said arm and connected at its ends to the terminal posts 95 and 96, respectively of the receiver unit in any approved or well known manner, 97 designates the gauge pointer, 98 the link connecting the free end of the bi-metal arm to the gauge pointer, and 99 the gauge dial having an arcuate series of graduations 100 on the face thereof which in conjunction with the gauge pointer 97 function to register variations of one pound pressure in the pneumatic tire associated therewith.

Figure 16:
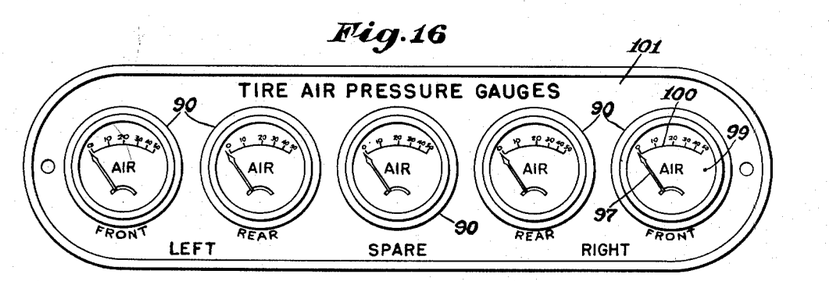
Fig. 16 is a front elevational view of a panel assembly of tire air pressure gauges for automotive passenger and light commercial vehicles.

A receiver or gauge unit 90 is provided, as above stated, for each pneumatic tire, including the spare, of the specific vehicle on or with which the present invention is employed, and in order to rapidly ascertain and quickly check the air pressure in any particular pneumatic tire, these receiver units 90 are grouped and preferably mounted upon the vehicle instrument board in any suitable manner and when so mounted are in full view of the vehicle operator at all times during operational periods of the vehicle. In Fig. 16 the receiver units 90 are shown as mounted in spaced aligned relation upon a panel 101, which latter is in turn mounted upon the vehicle instrument board at any desirable or suitable location thereon. It is, of course, to be here understood that this method of grouping and mounting the receiver units 90 is merely suggestive and that the method of grouping and mounting of such units may be considerably varied to accommodate and conform to the specific installations.

Figure 17:
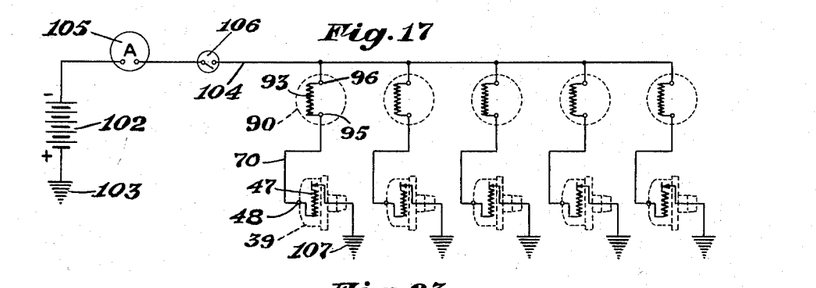
Fig. 17 is a wiring diagram for such assembly.

In Fig. 17 a wiring diagram of the tire air pressure gauges above described is illustrated and in such diagram the numeral 102 designates a battery or other source of electrical energy, grounded on the positive side of same, as at 103, and connected on its negative side to the main or current supplying conductor 104 having an ammeter 105 and a switch 106 in series therein, which latter in most instances is, although not necessarily, the vehicle ignition switch. The conductor 104 is also connected to the terminal posts 96 of each of the receiver or gauge units 90, while, the terminal posts 95 of each of said units 90 are connected by the conductors or leads 70, in a manner hereinbefore described, to the terminal posts 68 of the sender units 39, which latter are grounded, as at 107.

The arrangement and relationship of the sender units 39 and the receiver or gauge units 90, as herein disclosed, is particularly advantageous and highly desirable, for the reason that the same provides a safety factor or feature for the tire air pressure gauge apparatus when the latter is installed upon and in use with the pneumatic tired wheels of an automotive vehicle, inasmuch as the heating coils 93 of the receiver or gauge units 90 function also in the apparatus circuit as resistors, thus materially cutting down the amount of current flowing to and normally supplied the heating coils 47 of their correlated sender units 39. In connection with the foregoing, it should be noted and observed that in the event any of the branch conductors or leads, between their wheel hub cap sender units 39 and their vehicle instrument board receiver or gauge units 90, become grounded or short-circuited, for any reason, the receiver or gauge unit 90 of the grounded branch circuit will automatically and instantly register the full or maximum reading of the same, as, for example, fifty pounds (50 lbs.) for automotive passenger vehicles and light duty trucks and/or one hundred pounds (100 lbs.) for heavy duty trucks and trailers, thus warning the vehicle operator that something is amiss and requiring immediate attention, this without causing undue overheating of the affected circuit or the apparatus wiring in general and in consequence there- of substantially eliminating any possibility of damage to said circuit and/or wiring.

From the foregoing and by referring to Fig. 17, it will be manifest and apparent that when grounding or short-circuiting of any of the circuit branches 70 occurs, the make and break contacts 44 and 46 of the effected sender unit 39 are by-passed and cease to function. Consequently, current flows uninterruptedly through the heating coil 93 of the companion receiver or gauge unit 90 effecting maximum heating of the bi-metal arm 92 thereof and thus causing the gauge pointer 97 to move to its full or maximum reading. On the other hand, should a break occur in any of the circuit branches 70, for any reason, then and in that event, no current flows through either the sender heating coil 47 or the receiver heating coil 93; hence, and for this reason, the gauge pointer 97 of the affected receiver or gauge unit 90 will read zero, thus again warning the vehicle operator that something is amiss and requiring immediate attention.

In the operation of the tire air pressure gauge apparatus shown in Figs. 1 to 17, inclusive, the air pressure in each of the vehicle pneumatic tires deflects or flexes the diaphragm 42 of its correlated sender unit 39; this deflection flexes the arm 45, closing the contacts 44 and 46 and thus with the ignition or other switch 106 closed, the circuit is completed from the positive side of the battery 102 to ground 103, thence to grounded diaphragm 42, through closed contacts 44 and 46 and heater coil or wire 47, and from thence, for each vehicle front tire, through conductors 63, 67 and 70 to the heating coil or wire 93 of its related receiver or gauge unit 90, and for each vehicle rear tire, through conductors 63 and 80, commutator 81, brush 83 and conductor 70 to the heating coil or wire 93 of its related receiver or gauge unit 90, and from the latter through the conductor 104 ignition switch 106, ammeter 105 to the negative side of the battery 102. Upon completion or closing of the circuit in the manner above described current flows through the heating coil 47 of the sender unit 39 thereby increasing or raising the temperature of the bimetal thermostatic arm 43 of same and in consequence causing distortion or flexing of said arm, see Fig. 9, which latter in turns opens the contacts 44 and 46. The circuit being thus opened, the heating coil 47 and bi-metal arm 43 cool and in so doing such arm bends back or returns to its original flexed position, again closing the contacts 44 and 46, this cycle of opening and closing of such contacts is repeated continuously, and under normal operating conditions and with predetermined or selected tire air pressures said contacts open and close approximately one hundred and twenty times per minute. When the circuit is closed current also flows through the heating coil 93 of the receiver or gauge unit 90 thereby increasing or raising the temperature of the bi-metal thermostatic arm 92 of same and hence causes distortion or flexing of the latter which is imparted by the link 98 to the gauge pointer 97 to effect movement of the same upon the dial 99 and in co-operation with the arcuate series of dial graduations 100 register upon the gauge unit 90 the air pressure in pounds in the tire with which it is operatively interconnected. It will be obvious and apparent that the amount of gauge pointer movement depends upon the distortion of the arm 92 and consequently upon the temperature of the gauge unit heating coil 93 which temperature is of course controlled and governed by the opening and closing of the circuit by the contacts 44 and 46 and in the final analysis by any variation in tire air pressure. In concluding the operational description of the tire air pressure gauge apparatus, it might be well to state, that should the air pressure in the tire decrease, for any reason, the deflection of the diaphragm 42 decreases thereby lessening the distortion of the bi-metal arm 43 thus requiring less effort on the part of the latter to open the circuit, the end result being that said circuit is closed for a shorter period of time and in consequence the temperature of the heating coils 47 and 93 of the sender and receiver units 39 and 90, respectively, is reduced. Conversely, should the air pressure in the tire increase, for any reason, as for example, due to unduly high ambient or atmospheric temperatures, the deflection of the diaphragm 42 increases and consequently a greater distortion of the sender unit bi-metal arm 43 is required to open the circuit, which results in the latter remaining closed for a longer period of time and in consequence the temperature of the heating coils 47 and 93 of the sender and receiver units 39 and 90, respectively, is substantially increased, this higher temperature of the receiver unit heating coil 93 produces increased distortion of the gauge unit bi-metal arm 92 which is translated by the link 98 into a higher reading of the gauge pointer 97, as will be readily apparent. It should also be here stated, extensive use and exhaustive tests have shown and demonstrated, that the tire air pressure gauge apparatus herein disclosed is so highly sensitive that the slightest variation of air pressure in any of the vehicle tires is immediately reflected and registered on the gauge unit 90 of the affected tire.

In changing the tires of the front and rear wheel assemblies 30 and 71, the same procedure is followed as now practiced with wheels not equipped with the present tire air pressure gauge apparatus with the slight addition of first disconnecting the couplings 54 from the inner tube valves 34 and after the wheel hub caps 35 have been detached disconnecting the conductors 63 from their respective terminal posts 61 and 78 following which said hub caps may be laid aside until changing of their related tires has been completed, after which the wheel hub caps 35 are replaced, but just prior to such replacement the conductors 63 are reconnected with their respective terminal posts 61 and 78 and following such replacement the couplings 54 are reconnected to their correlated inner tube valves 34, thus completing the changing of the affected or particular tire.

To equip new automotive vehicles or those now in use with the novel tire air pressure gauges of the present invention involves no radical changes in the vehicle structures, as for example, incorporating such gauges in new vehicles at the factory merely requires a few additional fabricating steps on the parts involved in such incorporation, which steps can obviously be carried out at a very low cost when such parts are being fabricated, while, installation of such gauges on an old vehicle principally involves removal of the steering knuckles and rear axle shafts for drilling and tapping of same; also drilling and tapping the rear axle shaft housings; and the drilling of the necessary holes in the wheel hub caps, in order to effect such installation.

Figures 18, 19, 20, 21, 22:
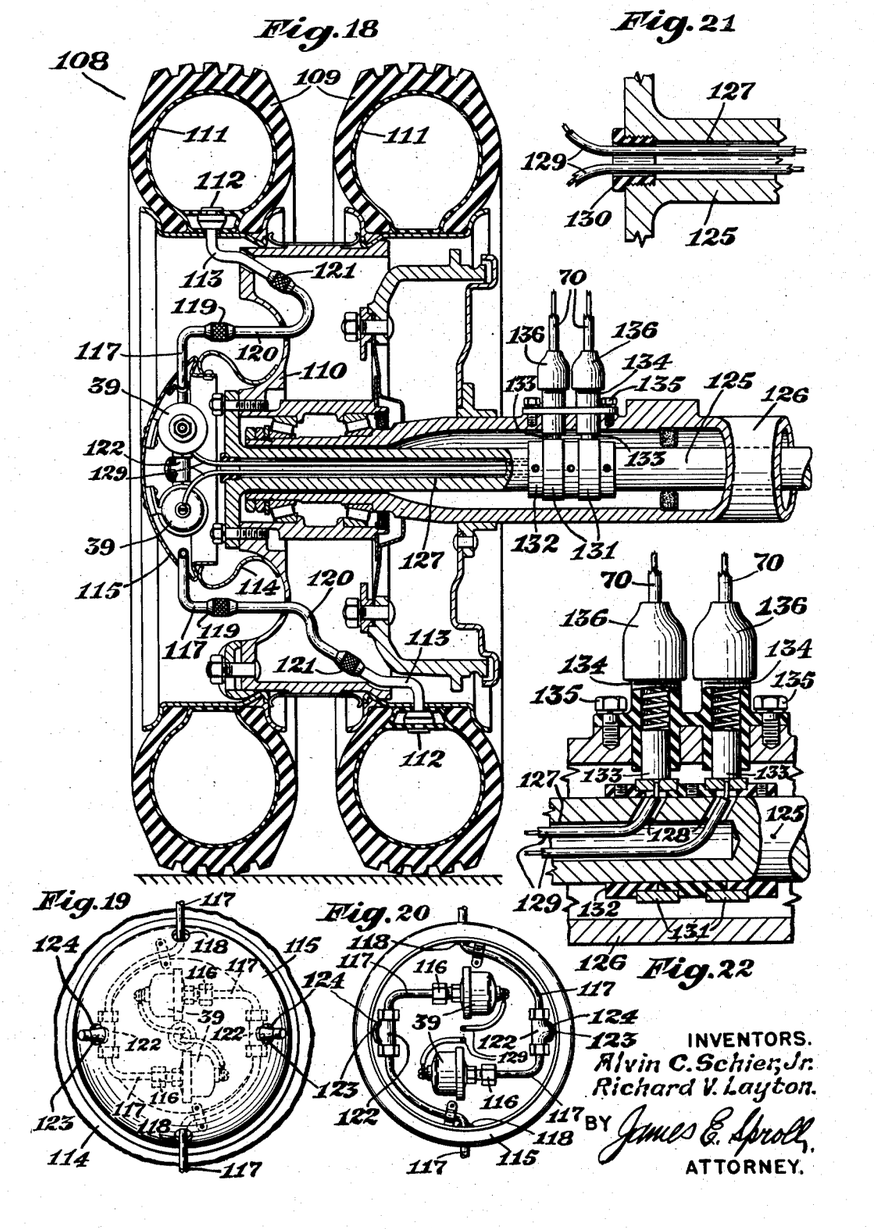
Fig. 18 is a vertical transverse section of a commercial automotive vehicle left rear wheel assembly having dual tires and equipped with dual thermo-electrical control or sender units for the tire air pressure gauges of such dual tires.
Fig. 19 is an elevational view of the outer face of the wheel hub cap of the dual tired wheel illustrating the dual supplementary tire inflating valves and tubing for the dual tires thereof.
Fig. 20 is a similar view of the inner face of the wheel hub cap illustrating the dual thermo-electrical control or sender units operatively mounted therein.
Fig. 21 is an enlarged fragmentary longitudinal section of the left hand end portion of the axle drive shaft of the dual tired wheel illustrating the manner of accommodating therein the wiring for the tire air pressure gauges of the dual tires of such wheel.
Fig. 22 is a similar section of an intermediate portion of said axle drive shaft and its associated shaft housing equipped with dual commutators and brushes of the dual tire air pressure gauge electrical circuit.

In Fig. 18 the numeral 108 generally designates the left rear wheel assembly of an automotive commercial vehicle or truck having dual pneumatic tires 109 mounted in a conventional manner upon a typical rear truck wheel 110. The tires 109 are provided with inner tubes 111 having the customary inner tube valves 112, the outer terminals 113 of which converge inwardly in the usual manner substantially as shown in Fig. 18. The wheel 110 on its outer face is provided, in the present instance, with an annular and curvilinear concentrically disposed housing 114, which is rigidly secured at its inner end to said wheel in any suitable manner, not shown, and carried by the outer end of said housing 114 is a demountable wheel hub cap 115 of well known form.

Operatively mounted upon and secured to the inner face of the wheel hub cap 115 in cushioned relation thereto and in spaced parallel relation to each other is a pair of thermo-electrical sender units 39 and detachably connected, as by coupling nuts 116, to air pressure inlets of said units 39 are the inner terminals of sectional air pressure conducting tubes 117, the outer sections of which are angularly bent to pass outwardly through apertures 118 formed in the marginal portion of the wheel hub cap 115 and from which said sections extend radially and adjacent their outer ends are again angularly bent towards the wheel 110, to permit the outer terminals thereof being detachably connected by couplings 119 to the outer terminals of air pressure conducting tubes 120 carried by and mounted upon the wheel 110 interiorly thereof, said last mentioned tubes having their inner terminals similarly connected by couplings 121 to the outer terminals 113 of the inner tube valves 112 above described.

The opposing ends of the sectional air pressure conducting tubes 117 are interconnected, within the wheel hub cap 115 by T fittings 122 and such fittings upon the side branches thereof are provided with normally capped tire inflating valves 123 of any well known or conventional type, which valves project radially through apertures 124 also formed in the marginal portion of the wheel hub cap 115, thus rendering such valves readily accessible for the rapid attachment of an air supply hose thereto, when either of the inner tubes 111 are to be inflated, as will be manifest and apparent.

In Figs. 18, 21 and 22, the numeral 125 designates the axle drive shaft of the dual tired vehicle, which is customarily enclosed in an axle housing 126, said axle drive shaft at its outer flanged end being rigidly secured in an obvious and well known manner to the rear truck wheel 110, and as now fabricated such axle drive shaft 125 is provided with an axial bore 127 drilled from the aforesaid outer flanged end to a point slightly beyond the inner side of the inside tire 109, and at or near such point said shaft is angularly drilled to provide suitable spaced twin holes 128 for establishing communication between the periphery of the axle drive shaft and the inner end portion of the bore 127, as shown in Fig. 22.

The function of the axial bore 127 and the twin holes 128 is to accommodate insulated conductors 129 which extend therethrough with their outer end portions extending or passing through an insulated bushing 130 threadedly secured in the outer end of the bore 127, in order that their outer terminals may be connected to the terminals of the sender units 39, in the same manner as hereinbefore described for the corresponding units of the wheel assemblies 30 and 71. The insulated conductors 129 at their inner terminals are connected to twin commutator rings 131 mounted upon the axle drive shaft 125 for rotation therewith and are insulated therefrom by a sectional insulating sleeve 132 having twin annular grooves formed in its periphery to receive and accommodate said rings 131.

Normally abutting the commutator rings 131 are twin spring-pressed brushes 133, each operatively mounted within its related housing of a twin brush holder 134 of insulating material, which is rigidly secured, by cap screws 135, to the periphery of the axle housing 126. Each housing of the holder 134 is provided with a dust cap 136 through each of which an insulated conductor 70 extends for connecting the brushes 133 to their respective or related receiver or gauge units 90, in the identical manner, as hereinbefore described for the brush 83 of the rear wheel assembly 71.

Figure 23:
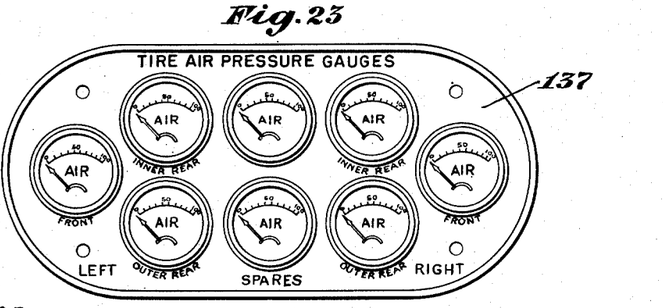
Fig. 23 is a front elevational view of a panel assembly of the tire air pressure gauges for an automotive commercial vehicle having dual rear tires.

The receiver or gauge units 90 for the tire air pressure gauge apparatus of the dual tired rear wheel assembly 108 may be grouped upon a gauge panel 137, substantially in the manner shown in Fig. 23, and such panel 137 may be attached to the truck instrument board or any other convenient location providing of course that the truck operator has a full and unobstructed view of same at all times during the operation of the truck. The assembly or grouping of the receiver units 90 shown in Fig. 23 is again merely suggestive and is subject to the conditions of the specific installation.

Figure 24:
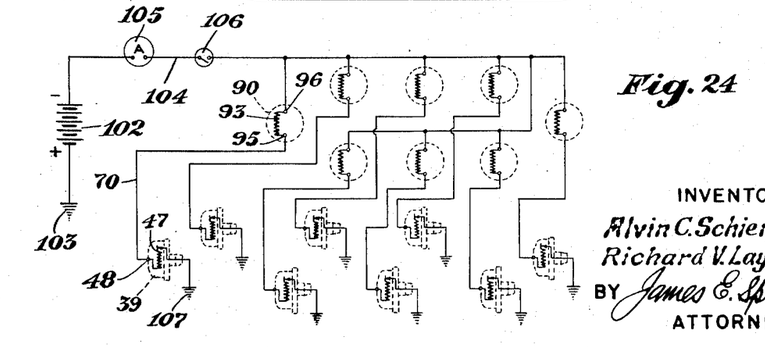
Fig. 24 is a wiring diagram for such assembly of tire air pressure gauges.

In Fig. 24 a wiring diagram of the tire air pressure gauge apparatus is shown for an automotive commercial vehicle having dual rear tires, which differs from the wiring diagram hereinbefore shown and described merely in the addition of several more sender units 39 and gauge units 90 thereto, otherwise it is the same, and inasmuch as the operation of the units of such apparatus is identical to that of the units of the apparatus previously described, it is thought and deemed unnecessary to repeat same here. For sake of clarity and readier understanding of the wiring diagram of Fig. 24, the reference characters used therein are same as those used in Fig. 10 for corresponding parts.

From the foregoing description and by referring to Figs. 18 to 20, inclusive, of the drawings, it will be readily apparent and obvious that by locating the tire inflating valves 123 in the wheel hub cap 115 and by having the same project therefrom in the manner disclosed, such valves 123 are rendered readily accessible for application of the air supply hose thereto, also by locating the sender units 39 in symmetrical relation within the hub cap 115 the wheel assembly is positively maintained in balance.

The procedure of changing the tires 109 is carried out in substantially the same manner as formerly with of course the added steps of first uncoupling or disconnecting the couplings 119 and 121, respectively, and prior to complete removal of the wheel hub cap 115 effecting disconnection of the conductors 129 from their correlated sender units 39, otherwise removal of the tires 109 from the wheel 110 is carried out in the former and usual manner.

While, in the instant disclosure, we have shown and described the apparatus of the invention as employed in and on automotive vehicles, we desire to have it here understood that the present apparatus may also be profitably employed and used to advantage in various other ways, as an example, employing such apparatus to register and show at a central or control point the individual pressures in a series of remotely located tanks containing fluids under pressure, or other like and similar uses.

Briefly and in conclusion, long and gruelling tests and extensive actual use under the most adverse and worst road conditions has shown and demonstrated that the present tire air pressure gauge and/or gauge apparatus is wholly unaffected by the same and can and does continue to function efficiently regardless of the amount of punishment to which it is or may be subjected.

Manifestly, therefore, the tire air pressure gauge and/or gauge apparatus of the present invention is extremely simple, compact and durable in construction; is easily and economically installed on either new or old automotive vehicles; is thoroughly practical and serviceable in use and operation; is instantly responsive to the slightest variation in tire air pressures and is accurate in the registration of same; is not susceptible to ready development of defects and conforms strictly to and with standard automotive practice.

While we have herein shown and described the invention with sufficient detail to enable those skilled in the art to understand the mode of construction and the principles involved, it is to be understood that there is no intentional limitation herein to the specific forms and precise details of construction herein disclosed, except as expressly defined by the appended claims, and that various modifications of said construction may be resorted to without departing from the spirit of the invention, or the benefits derivable therefrom. We also desire to have it understood that certain features of the invention herein disclosed may be employed in and with various other combinations than those shown and described.

Having thus fully described our invention, what we claim as new and desire to secure by Letters Patent is:

1. In combination with an automotive vehicle stock wheel having an apertured demountable wheel hub cap and a pneumatic tire including a tire inflating valve, a tire air pressure gauge comprising a pressure-responsive thermo-electric control-sender unit mounted upon and secured to the inner face of said apertured demountable wheel hub cap, said unit including air conducting means adapted to pass outwardly from such hub cap through the aperture thereof, whereby such unit is detachably connected to the inflating valve of said pneumatic tire exteriorly of said vehicle wheel and demountable wheel hub cap and is jointly removable with the latter from such wheel upon its detachment from said inflating valve; and a thermo-electric receiver-gauge unit cooperating with and controlled by said control-sender unit for registering the air pressure in said pneumatic tire at a point remote from said wheel.

2. In combination with a pneumatic tired automotive vehicle stock wheel having an apertured demountable wheel hub cap and an inner tube including a tube inflating valve, a tire air pressure gauge comprising a pressure-responsive thermo-electric control-sender unit operatively mounted upon and secured to the inner face of said demountable wheel hub cap including an air pressure conducting tube adapted to pass outwardly from such hub cap through the aperture thereof, whereby said unit is detachably connected to the tube inflating valve of said inner tube exteriorly of said vehicle wheel and demountable wheel hub cap and is jointly removable with the latter from such wheel upon its detachment from said inflating valve; and a thermo-electric receiver-gauge unit co-operating with and controlled by said sender-unit for registering the air pressure in said inner tube at a point remote from said wheel.

3. In a tire air pressure gauge system for an automotive vehicle having pneumatic tired stock wheels equipped with demountable wheel hub caps, pressure-responsive thermo-electric control-sender means individual to each of said stock wheels and operatively mounted upon and secured to the inner faces of the demountable wheel hub caps thereof for removal therewith when such caps are detached from their companion wheels, said control-sender means also including means for effecting detachable connection of the same with their companion tires exteriorly of their wheels and wheel hub caps; and a series of thermo-electric receiver-gauges mounted upon said vehicle and corresponding to the number of tires thereof and operatively connected with and controlled by their correlated control-sender means for registering the air pressures in said tires on their respective receiver-gauges at a point remote from said wheels.

4. In a tire air pressure gauge system for an automotive vehicle having an instrument board and pneumatic tired stock wheels equipped with tire inflating valves and demountable wheel hub caps, pressure-responsive thermo-electric control-sender units individual to each of said stock wheels and operatively mounted upon and secured to the inner faces of the demountable wheel hub caps thereof for removal therewith when such caps are detached from their companion wheels, said control-sender units also including means for removably connecting the same with their companion tire inflating valves exteriorly of their wheels and wheel hub caps; and a series of thermo-electric receiver-gauge units operatively mounted upon said instrument board and individually and operatively connected with and controlled by their companion control-sender units for registering the air pressures in the tires of the latter on their respective receiver-gauge units at said instrument board.

5. In combination with an automotive vehicle stock wheel having a pneumatic tire and a demountable wheel hub cap, a tire air pressure gauge comprising control-sender means operatively mounted upon and secured to the inner face of said demountable wheel hub cap for removal therewith when the same is detached from said wheel, said control-sender means including a pressure-responsive thermo-electric unit and means for detachably connecting the same to said pneumatic tire exteriorly of said wheel and wheel hub cap; a receiver-gauge having a thermo-electric unit operatively connected with and controlled by the pressure-responsive thermo-electric unit of said control-sender means whereby the air pressure in said tire is registered by said receiver-gauge at a point remote from said wheel; and a source of electrical energy for heating said thermo-electric units.

6. In combination with a pneumatic tired automotive vehicle stock wheel having a tire inflating valve and a demountable wheel hub cap, a tire air pressure gauge comprising control-sender means operatively mounted upon and secured to the inner face of said demountable wheel hub cap for removal therewith when the same is detached from said wheel, said control-sender means having a pressure-responsive thermo-electric unit including a make and break contact and means for detachably connecting the same to said tire inflating valve exteriorly of said wheel and wheel hub cap; a receiver-gauge having a thermo-electric unit operatively connected with said pressure-responsive thermo-electric unit and controlled by the make and break contact of the same whereby the air pressure in said tire is registered by said receiver-gauge at a point remote from said wheel; and a source of electrical energy for heating said thermo-electric units.

7. In combination with a pneumatic tired automotive vehicle stock wheel having a tire inflating valve and a demountable wheel hub cap, a tire air pressure gauge comprising control-sender means operatively mounted upon and secured to the inner face of said demountable wheel hub cap for removal therewith when the same is detached from said wheel, said control-sender means having a pressure-responsive thermo-electric unit including a make and break contact grounded upon said wheel hub cap and also including means for detachably connecting the same to said tire inflating valve exteriorly of said wheel and wheel hub cap; a vehicle carried receiver-gauge having a thermo-electric unit operatively connected to said pressure-responsive thermo-electric unit and controlled by the make and break contact of the same; a source of electrical energy grounded upon the vehicle of said wheel and having a connection with the thermo-electric unit of said receiver-gauge and through such unit with the thermo-electric unit of said control-sender means; and a switch for opening and closing the connection between the source of electrical energy and the thermo-electric unit of the receiver-gauge whereby heating of both of the aforesaid thermo-electric units is effected and the air pressure in said tire is registered by said receiver-gauge at a point remote from said wheel when said switch is closed.

ALVIN C. SCHIER, Jr.
RICHARD V. LAYTON.

REFERENCES CITED

The following references are of record in the file of this patent:

UNITED STATES PATENTS

| Number | Name | Date |
| --- | --- | --- |
| 1,849,139 | Denmire | Mar. 15, 1932 |
| 2,033,424 | Gieskieng | Mar. 10, 1936 |
| 2,168,145 | Willis | Aug. 1, 1939 |
| 2,230,906 | Potts | Feb. 4, 1941 |
| 2,235,930 | Huggins | Mar. 25, 1941 |
| 2,279,140 | Kellen | Apr. 7, 1942 |